UNITED STATES PATENT OFFICE.

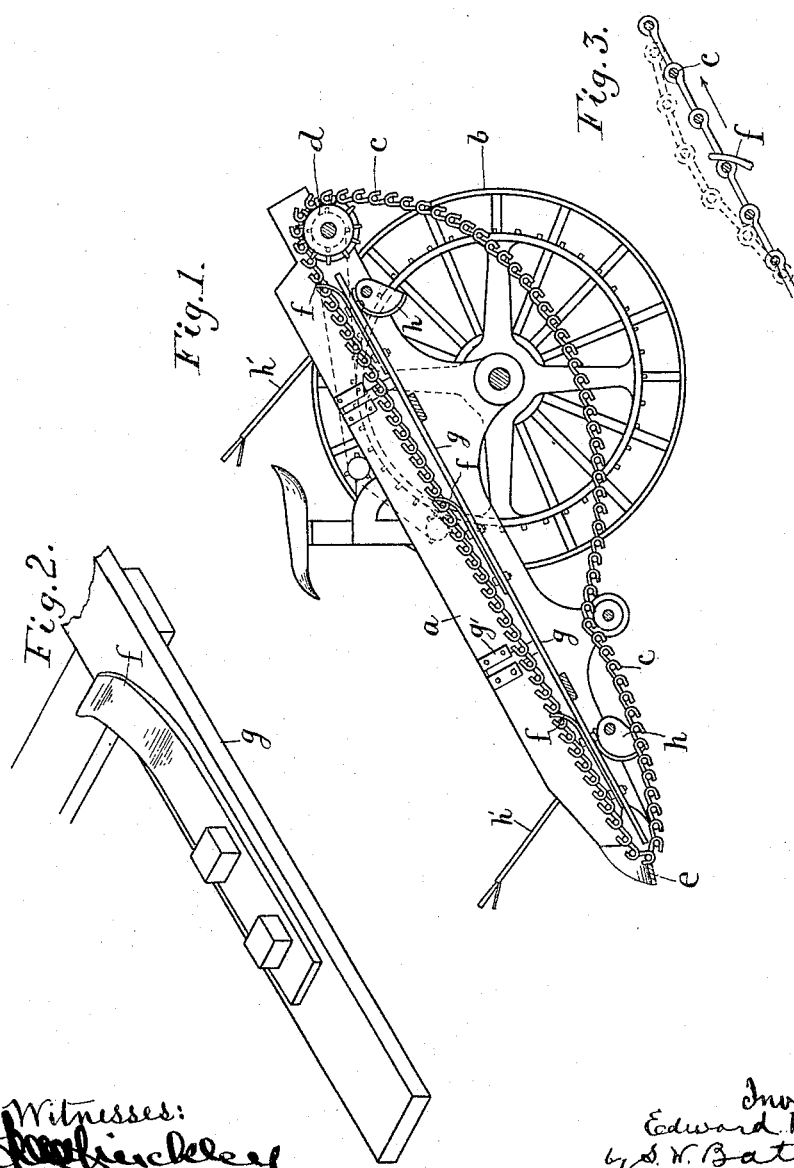

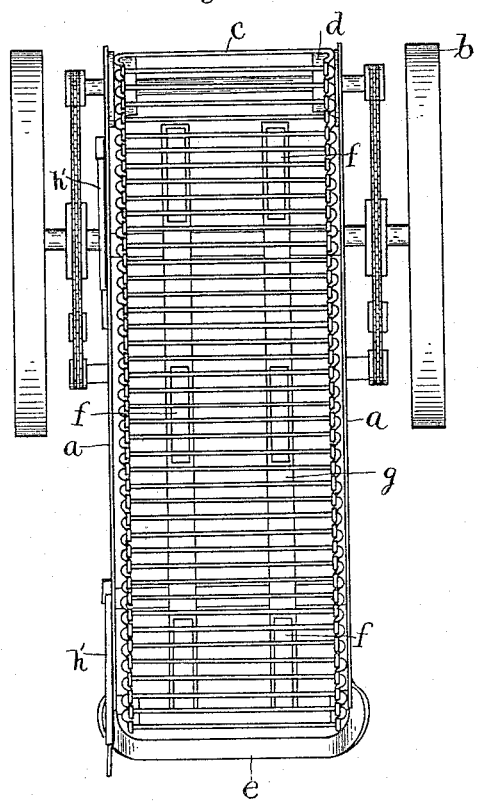
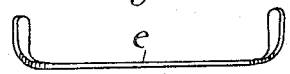

EDWARD P. KENDALL, OF BOWDOINHAM, MAINE.

POTATO-DIGGER.

1,163,348. Specification of Letters Patent. Patented Dec. 7, 1915.

Application filed October 27, 1911, Serial No. 657,162. Renewed April 17, 1914. Serial No. 832,632.

*To all whom it may concern:*

Be it known that I, EDWARD P. KENDALL, of Bowdoinham, in the county of Sagadahoc and State of Maine, have invented certain new and useful Improvements in Potato-Diggers, of which the following is a specification.

My invention relates to potato diggers of that class in which an endless skeleton conveyer receives the dirt, vines and potatoes excavated by a digging blade and carries them upwardly and rearwardly and discharges them over the rear end of the machine. In these diggers a very great amount of dirt is taken up with the potatoes and it is necessary to discharge this dirt through the openings in the conveyer before it reaches the rear end of the machine. It is accordingly common to provide shaking devices of various descriptions by which the conveyer as a whole is agitated or sections of the conveyer are separately agitated. In the case of the diggers now commonly used, it is found to be impossible to get rid of all the dirt on the conveyer proper and auxiliary means are used in rear of the conveyer as, for instance, longitudinally arranged parallel rods down which the potatoes roll as they fall from the rear end of the conveyer and where the balance of the dirt is supposed to be disposed of.

The object of my invention is to apply to the conveyer such a sharp and effective agitation that all the dirt will be sifted through the openings in the conveyer before the potatoes reach the rear end, thus avoiding the necessity of an auxiliary separating means in rear of the conveyer. I accomplish this object by causing the ascending portion of the conveyer to ride on rearwardly inclined fingers which are preferably made of spring steel, and by which the sections of the conveyer are thrown violently upward forming a series of waves from end to end of the conveyer whereby the clods of earth are broken up and all the earth sifted down through before the rear end of the conveyer is reached.

My invention will best be understood by reference to the accompanying drawings in which is shown a potato digger constructed according to my invention.

In the drawing, Figure 1 is a general longitudinal section through the digger, Fig. 2 is a perspective of one of the spring fingers, Fig. 3 is a diagram illustrating the effect of the fingers upon the conveyer chain, Fig. 4 is a plan view of the digger, and Fig. 5 is a front view of the digging blade.

In the drawing, $a$ represents the body, $b$ the wheels, $c$ the conveyer chain and $d$ the power sprocket. These parts may be of ordinary and well known construction. The conveyer chain is made up of the usual link sections with cross rods forming a skeleton construction which will carry the potatoes and allow the earth to pass down through.

I form the digging blade of a flat knife or cutter $e$ which is substantially straight from side to side and relatively narrow so that it cuts the entire body of earth from the hills, carrying earth and all directly onto the conveyer.

The conveyer chain is thrown into violent agitation by a series of stationary, rearwardly inclined and widely separated fingers, here shown as three pairs, the fingers of each pair being arranged side by side.

In the present form of my machine, the three pairs of fingers $ff$ are located, one pair at the lower end, one at the middle, and one at the upper end. These fingers are preferably made of spring steel and their operative ends which support the conveyer and on which the latter rides are bent sharply upward with a small rearward inclination with respect to the path of the chain. They are set at such an angle that when one of them is struck by one of the cross rods of the conveyer the latter will be thrown sharply upward, as shown in dotted lines in Fig. 3, giving the chain a sudden shake which breaks up the earth and causes it to fall through the openings of the conveyer. The fingers are slightly yielding and they furnish substantially all of the support the chain requires, the latter riding on these points and being drawn rapidly over them.

Means are provided for making the fingers adjustable vertically and for this purpose they are secured to a supporting bar $g$ supported in guides $g'$ which permit a vertical movement of the bar. The bar $g$ is adjusted vertically by means of cams $h$, one at each end of the machine and levers $h'$ enable the operator to raise or lower the supporting bar and the fingers to give more or less agitating motion to the chain.

In Fig. 3 is shown how the links of the chain striking on the fingers near their upper ends are thrown upwardly carrying the chain with it and setting up a kind of wave motion at three points, the two ends and the middle. As one link is thrown upward several will usually pass over the fingers without touching. The violent agitation thus set up breaks up the clods, sifts the earth rapidly through the conveyer, leaving the potatoes, sods, vines, etc., on the conveyer to be dumped on the ground in rear of the machine or otherwise disposed of. This shaking motion by being concentrated on particular parts of the chain takes less power than where the whole structure is shaken and I am thus enabled to make my machine lighter and shorter than the ordinary digger. It also draws easier, the conveyer is run at a less speed and the construction is far more simple than other diggers of this class.

A great advantage of my machine is that it enables the operator to dig potatoes on wet land as it easily shakes the clods of wet earth to pieces and prevents the conveyer from becoming clogged. Thus my digger can be used in ground where other diggers cannot work, a very important feature.

By eliminating the earth rapidly from the conveyer the machine is relieved of much weight that ordinary machines have to carry.

By raising or lowering the fingers $f$ by means of the cams $h$, I can gage the shaking motion according to the character of the soil and the work the machine has to do. The higher the fingers are lifted, the more violently they agitate the chain and the more work it does. It will be noted that by operating the cams $h$ the degre of inclination of the fingers $f$ to the upper run of the conveyer $c$ may be varied. This arrangement and operation also permits one portion of the conveyer $c$ to be agitated more violently than the other portion.

The form and position of the digging blade enables me to cut below the level of the lowest potatoes and to lift the body of earth the whole width of the machine. The earth as it comes immediately in contact with the conveyer begins to sift through and before the top of the conveyer is reached it is all gone.

It is only by rapidly handling the earth that all the potatoes can be saved, and my combination of arrow digger blade and violently shaken chain accomplishes this result.

By the use of my digging blade the earth is brought in contact with the conveyer without being disturbed or heaped up on the digging point as is the case with most machines, and I am therefore enabled to prevent the potatoes from being forced out at the sides of the hill and crushed by the wheels.

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting.

I claim:—

1. A potato digger comprising an endless conveyer screen composed of cross bars flexibly connected, and upwardly-inclined yielding fingers spaced apart longitudinally of and disposed under the upper flight of the screen and having their free upper ends in the path of the bars whereby the latter ride up and drop abruptly from the extremities of the fingers.

2. A potato digger comprising an endless conveyer screen composed of cross bars flexibly connected, upwardly-inclined yielding fingers spaced apart longitudinally of and disposed under the upper flight of the screen and having their free upper ends in the path of the bars whereby the latter ride up and drop abruptly from the extremities of the fingers, and means for adjusting the inclination of the fingers.

3. A potato digger comprising an endless conveyer screen composed of flexibly connected cross bars, and a plurality of fingers spaced longitudinally of and disposed under the upper flight of the screen with their free ends in the path of the cross bars, the front sides of the fingers being concavely curved.

4. A potato digger comprising an endless conveyer screen composed of cross bars flexibly connected, relatively stationary fingers spaced apart longitudinally of and disposed under the upper flight of the conveyer, said fingers having their upper surfaces inclined upwardly and rearwardly to engage the bars of the upper flight of the conveyer at a plurality of points to impart sags to such upper flight, the bars of the conveyer being adapted to ride up the said inclined surfaces and abruptly drop off the same whereby the maximum breaking action of the soil occurs immediately behind each finger, and means under the control of the operator for adjusting the inclination of said fingers to vary the breaking action of the soil by the said fingers.

5. In a potato digger, the combination of a screening conveyer for taking potatoes and material from a digging appliance, and upwardly extending springs arranged beneath the upper run of the said conveyer to be engaged thereby and put under tension and to intermittently deliver blows thereto.

6. In a potato digger, the combination of a screening conveyer for taking potatoes and material from a digging appliance, upwardly extending springs arranged beneath the upper run of the said conveyer to be engaged thereby and put under tension and to intermittently deliver blows thereto, and means for adjusting the springs to bear more or less strongly on the conveyer.

7. In a potato digger, the combination of a screening conveyer for taking potatoes and material from a digging appliance, upwardly extending springs arranged beneath the upper run of the said conveyer to be engaged thereby and to cause the agitation thereof by a series of intermittent blows, and means for adjusting the springs to bear more or less strongly on the conveyer, the said springs being arranged at different points of the length of the conveyer.

8. In an apparatus of the character described, the combination of a conveying screening conveyer for taking on its upper run material and potatoes from a digging appliance, an agitating spring arranged beneath the upper run of said conveyer to be engaged thereby, and successively put under tension and then released to deliver an agitating blow to said conveyer, and means for operating said conveyer.

9. In an apparatus of the character described, the combination of a conveying mechanism comprising a series of transverse rods, a spring having its free end disposed in the path of movement of said rods and arranged to be deflected and released by each of said rods, whereby said spring strikes each succeeding rod a blow to agitate the conveying mechanism, and means for moving said conveying mechanism relatively to said spring.

10. In apparatus of the character described, the combination of a conveying mechanism comprising a series of transverse rods, a spring having its free end disposed in the path of movement of said rods and arranged to be deflected and released by each of said rods, whereby said spring strikes each succeeding rod a blow to agitate the conveying mechanism, means for moving said conveying mechanism relatively to said spring, and means for inclining said spring relative to the plane of movement of said conveying mechanism.

11. In apparatus of the character described, the combination of a conveying mechanism comprising a series of transverse rods, a series of springs having their free ends disposed in the path of movement of said rods and each arranged to be deflected and released by each rod as the conveying mechanism moves rearwardly, whereby each spring strikes the succeeding rods blows successively to agitate the conveying mechanism, the said springs being spaced from each other longitudinally of the conveying mechanism, and means for moving said conveying mechanism relatively to said springs.

12. In apparatus of the character described, the combination of a conveying mechanism comprising a series of transverse rods, a series of springs having their free ends disposed in the path of movement of said rods and each arranged to be deflected and released by each rod as the conveying mechanism moves rearwardly, whereby each spring strikes the succeeding rods blows successively to agitate the conveying mechanism, the said springs being arranged to operate on different portions of each rod, and means for moving said conveying mechanism relatively to said springs.

13. In apparatus of the character described, the combination of a conveying mechanism comprising a series of transverse rods, a series of springs having their free ends disposed in the path of movement of said rods and each arranged to be deflected and released by each rod as the conveying mechanism moves rearwardly, whereby each spring strikes the succeeding rods blows successively to agitate the conveying mechanism, the said springs being arranged to operate on different portions of each rod and spaced from each other longitudinally of the conveying mechanism, and means for moving said conveying mechanism relatively to said springs.

14. In a potato harvester, the combination of a screening conveyer at the rear of the same for taking potatoes and material therefrom, upwardly turned springs arranged beneath the upper run of the said conveyer to strike and cause the agitation of the same, movable bars carrying the said springs, and cam means for moving said bars to adjust the springs relative to the conveyer.

15. In an apparatus of the character described, the combination of a conveying mechanism comprising a series of transverse rods, a spring supported at its forward and lowermost end beneath the upper run of said conveying mechanism and having its rearward end free and curved upwardly into the travel of the said upper run of said conveying mechanism.

16. In an apparatus of the character described, the combination of a conveying mechanism comprising a series of transverse rods, a rising and falling support longitudinally disposed between the runs of said conveying mechanism and a plurality of springs each secured at its forward and lower end to said support and having its rear end free and curved into the travel of the upper run of said conveying mechanism.

In testimony whereof I have affixed my signature, in presence of two witnesses.

EDWARD P. KENDALL.

Witnesses:
S. W. BATES,
C. B. CREIGHTON.

Copies of this patent may be obtained for five cents each, by addressing the "Commissioner of Patents, Washington, D. C."